United States Patent
Luckhardt

(10) Patent No.: US 11,585,535 B2
(45) Date of Patent: Feb. 21, 2023

(54) APPLIANCE FOR PROCESSING FOOD AND METHOD OF OPERATING SAME

(71) Applicant: Electrolux Home Products Corporation N. V., Brussels (BE)

(72) Inventor: Christoph Luckhardt, Rothenburg ob der Tauber (DE)

(73) Assignee: Electrolux Home Products Corporation N. V., Brussels (BE)

(*) Notice: Subject to any disclaimer, the term of this patent is extended or adjusted under 35 U.S.C. 154(b) by 493 days.

(21) Appl. No.: 14/381,617

(22) PCT Filed: Apr. 9, 2013

(86) PCT No.: PCT/EP2013/057375
§ 371 (c)(1),
(2) Date: Aug. 28, 2014

(87) PCT Pub. No.: WO2013/167333
PCT Pub. Date: Nov. 14, 2013

(65) Prior Publication Data
US 2015/0056344 A1    Feb. 26, 2015

(30) Foreign Application Priority Data
May 8, 2012 (EP) .................................... 12167143

(51) Int. Cl.
*F24C 7/08* (2006.01)
*G06F 16/28* (2019.01)
*G06F 16/583* (2019.01)

(52) U.S. Cl.
CPC .............. *F24C 7/081* (2013.01); *F24C 7/085* (2013.01); *G06F 16/285* (2019.01); *G06F 16/5838* (2019.01)

(58) Field of Classification Search
CPC ..... F24C 7/081; F24C 7/085; G06F 17/30256; G06F 17/30598
See application file for complete search history.

(56) References Cited

U.S. PATENT DOCUMENTS 5,668,897 A * 9/1997 Stolfo ............... G06F 17/30247
382/283
7,223,951 B2   5/2007 Jung
(Continued)

FOREIGN PATENT DOCUMENTS

CN    1704667 A    12/2005
CN    1800721 A    7/2006
(Continued)

OTHER PUBLICATIONS

Translation of Office Action in Chinese Patent Application No. 201380021257.9, dated Nov. 24, 2015.
(Continued)

*Primary Examiner* — Erik Kashnikow
*Assistant Examiner* — Ashley Axtell
(74) *Attorney, Agent, or Firm* — Pearne & Gordon LLP

(57) ABSTRACT

Appliance for processing food and method of operating the same The present application in particular is related to a method of operating a cooking appliance, in which a food category of a food item automatically can be assigned based on features extracted from an image of the food item. For improving assignment, the method is provided with self learning performance.

12 Claims, 2 Drawing Sheets

(56) References Cited

U.S. PATENT DOCUMENTS

Figure 1:
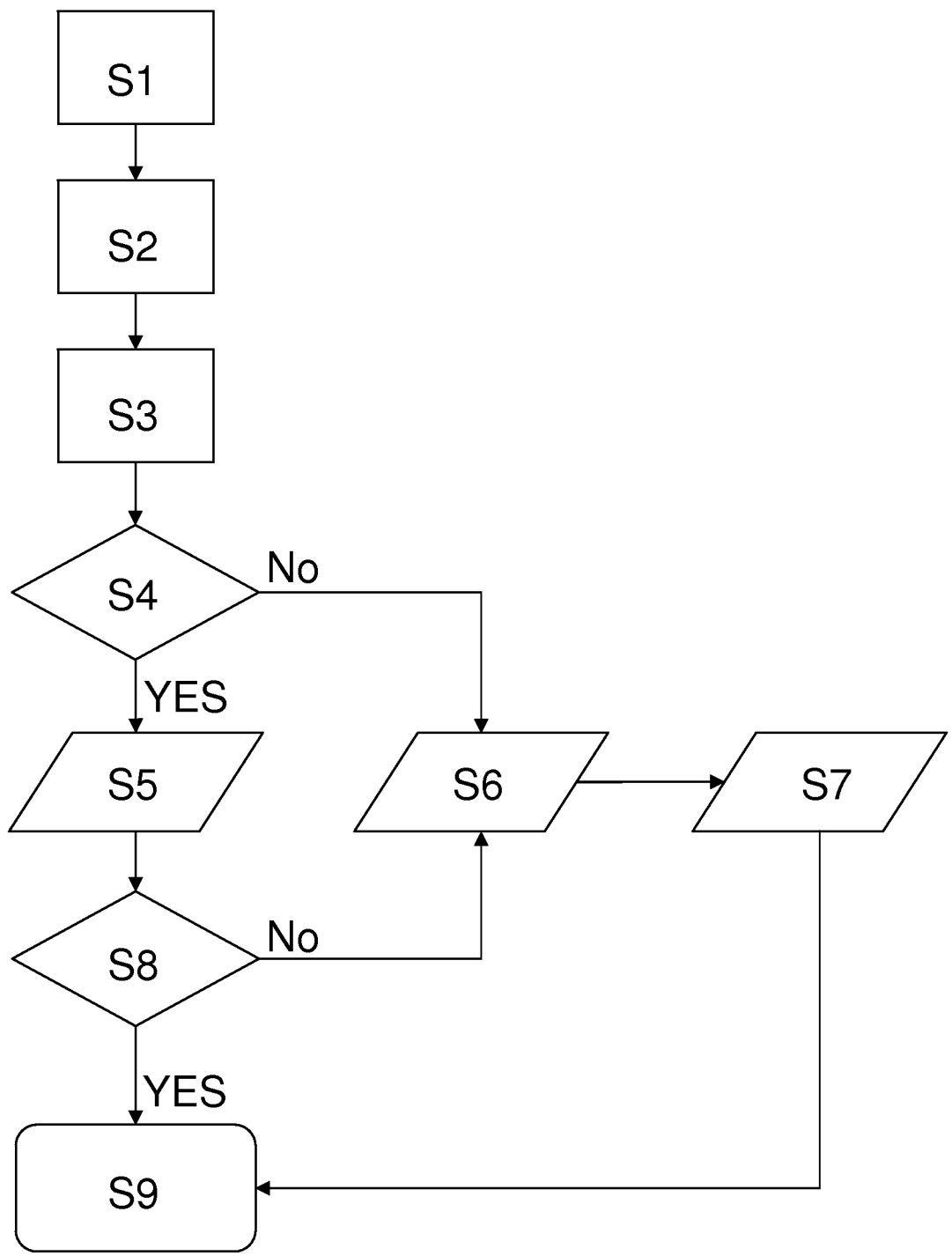

| | | | |
|---|---|---|---|
| 7,326,888 B2 | 2/2008 | Chun et al. | |
| 2005/0114377 A1* | 5/2005 | Russell | G06F 17/30598 |
| 2005/0247695 A1* | 11/2005 | Lee | F24C 7/085 |
| | | | 219/489 |

FOREIGN PATENT DOCUMENTS

| | | |
|---|---|---|
| CN | 1900858 A | 1/2007 |
| DE | 202011002570 | 5/2012 |
| EP | 0563698 | 10/1993 |
| EP | 2444735 | 4/2012 |
| JP | 02122119 | 5/1990 |

OTHER PUBLICATIONS

International Search Report for PCT/EP2013/057375, dated Jul. 4, 2013, 2 pages.

* cited by examiner

APPLIANCE FOR PROCESSING FOOD AND METHOD OF OPERATING SAME

The present invention in particular is related to an appliance for processing food, such as a cooking oven, and a method of operating the appliance or oven.

In particular from documents DE 10 2007 048 834 A1, EP 0 563 698 A2 and US 2007/0029306 A1 methods of operating, i.e. controlling a cooking oven and cooking apparatus, respectively, are known. The methods use images captured from food inside respective cooking chambers for at least partial automatic control of cooking processes.

However, there is still need for further improvements in automated or semi-automated processes for appliances for processing food, in particular appliances such as cooking ovens.

Therefore, it is an object of the invention to provide an alternative and in particular improved method of operating an appliance for processing food, such as a cooking oven. Further, an appliance for processing food, in particular cooking oven, shall be provided.

This object is solved by a method of operating an appliance for processing food. The appliance may in particular be a cooking or baking oven, including but not restricted to electric cooking and baking ovens. Further the appliance may be a microwave oven or other similar device for processing food.

The appliance, in particular oven, to which the proposed method can be applied, is equipped with a chamber adapted and configured to accommodate and process at least one food item therein.

The proposed method comprises a step of capturing at least one image or picture of the at least one food item placed or to be placed in the chamber. For capturing the at least one image, there may be used a camera arranged in such a way that the image of the food item placed in proper and/or ordinary arrangement and/or alignment within the chamber can be captured by the camera. However, the at least image can also be captured otherwise, in particular prior and/or during inserting the food item into the chamber. The at least one image, which may be a single image or a set of images, may be stored at least in a volatile memory, but also in a non-volatile memory, at least, however, in a way to enable execution of further steps of the proposed method.

The proposed method comprises a further step of extracting a set of characteristic features of at least one of the at least one food item from the captured image. The set of characteristic features in particular may be a set of parameters, in particular predefined parameters, suitable for categorizing food items as such.

Extracting respective features in particular may be executed on the basis of image processing methods. In particular with respect to precision of the method, it may be advantageous to have an as great number of parameters or characteristic features as possible. However, in respect of a fast performance of the method, it may be advantageous to limit the number of characteristic features to a selected number of relevant features or parameters. In particular it may be possible to admit a user to select from a preset list of parameters or features some or a set of features that will be extracted and used during further operation.

If several food items are placed or are to be placed within the chamber, i.e. are intended to be processed, a common set of parameters or features may be extracted and used by further steps of the method. In the alternative, distinct food items may be treated as independent or distinct food items, and therefore separate sets of parameters and/or features may be extracted from respective separate food items.

The proposed method comprises a further step of assigning at least one food category to at least one of the at least one food item based on at least one of the characteristic features and a user input. In a comparatively straight forward approach, a single food category may be assigned to all items placed within or to be placed within the chamber. In a more elaborate approach, the possibility may be provided that distinct food items may be treated as separate food items. Hence it may be possible to assigned assign different food categories to different food items.

The method may provide a possibility for a user to overrule the appliance drive assignment of a respective food category. Hence, a step of requesting a user to affirm, verify and/or correct the, in particular automatic, selection or assignment of food category is implemented.

The proposed method comprises a further step of generating and storing at least one additional new dataset, comprising the extracted set of features linked to the assigned food category, in a feature database. The feature database may be implemented in a non-volatile memory of the appliance, in particular oven. The generation and storage of the new dataset in the database is conducted at least under the conditions as given below.

Note that, at least in an initial phase in which the statistical value of the stored datasets still can be improved, any of an extracted set of characteristic features together with a linked food category can be stored in the database. As the size of the database increases with the number of newly stored datasets, there may be provided provisions for reducing or limiting the size, in particular overall size, of the database. As an example, in case that every set of characteristic features and linked food category is stored in the database there may be a provision that duplicate databases are deleted or merged. In merging duplicate datasets, statistically relevant information, such as the number of occurrence of a given set of characteristic features and related food category, may be kept and/or stored as an additional parameter.

Generation and storage of the at least one new additional dataset may be conducted if the extracted set of characteristic features is new, i.e. is not yet contained in the feature database.

Generation and storage of the at least one new additional dataset may further be conducted in the case that the extracted set of characteristic features differs from a dataset stored in the feature database, in particular by a predefined amount. A difference between a stored and a new dataset in particular shall mean that at least one characteristic feature differs from a corresponding characteristic feature of a given, i.e. stored, dataset.

Generation and storage of the at least one new additional dataset may yet further be conducted if the assigned food category differs from a predefined or stored food category linked to the extracted set of characteristic features. This in particular means, that if the database contains a similar set of characteristic features to which a different food category had been assigned in a previous assignment, the new set of characteristic features is stored linked to the new food category, or is stored together with the new food category. For comparing different features or parameters, a comparison of respective numerical values may be performed. The degree of similarity or even identity may be assigned if respective numerical values lie in a predefined common range. In order to derive a food category from different features or parameters extracted from the image, respective features or parameters may be individually and separately compared to each other. In setting the food category it is also possible to combine numerical values derived from respective features or parameters. A combination or consideration of different features or parameters may in particular involve weighting or involve a weighting combination of different features or parameters, i.e. of respective numerical values thereof. In all, a new additional dataset will be stored in particular if any new set of parameters is observed and/or any new category is assigned to a food item under consideration.

Note that before storing a new dataset into the database, the user may be prompted as to whether the new dataset shall be added to the database or not. In this case, the user can influence the buildup of the database, in particular to most adequately represent the ordinary conditions of use for a respective user.

The proposed method comprises a further step of executing a food processing program assigned to the extracted set of characteristic features and food category. Executing the food processing program may be conducted automatically. However, it is also possible, that a user query is conducted or a user validation is required before automatically operating the appliance according to the food processing program assigned on the basis of the extracted features. Executing a food processing program in particular shall mean that the at least one food item will be processed within the food processing chamber of the appliance. During such a processing program, the appliance may be operated according to a stored program assigned to a certain food category, for example. It shall be mentioned, that during executing or conducting a program for processing a certain food item, further images of the at least one food item may be collected and used for automatically amending or adapting the processing program.

The method as proposed in particular enables an automatic operation of the appliance, and in particular a self-learning automatic operation of the appliance. In particular in contrast to known methods and devices, the proposed method allows the build up of a knowledge base for operating the appliance for different kinds of food items to be processed. The method therefore provides a type of a self-learning methodology for respective appliances. Due to the fact, that new information can be stored, provided and used for further optimizing the operation of the appliance, automatic operation of the appliance can continuously be improved. In particular it is possible to train pattern recognition capabilities which may be useful for automatic food category assignment. The method in particular allows the build up a of pattern recognition and in particular artificial neural network. Hence, an alternative and in particular improved method of operating an appliance for processing food can be obtained.

It may be of particular advantage, that the proposed method allows a user to build up a specific training dataset for food recognition, in particular a training dataset for automatic assignment of food category or food type.

In an embodiment, it is provided that assigning a food category to at least one of the at least one food item comprises a step of comparing the extracted characteristic features to at least one dataset already stored in the database. The at least one dataset stored in the database may comprise a set of extracted characteristic features of at least one food item and an assigned or linked food category.

A comparison of the newly extracted set of characteristic features to corresponding stored features may be done by a pair wise comparison of corresponding features. This in general requires that the datasets stored in the database and the set of newly extracted characteristic features comprise at least one feature in common. If the number and type of characteristic features of a set of characteristic features is fixedly defined, all datasets will contain corresponding features accessible for a pair wise comparison.

If, however, the number and/or type of characteristic features of a set of characteristic features are/is not fixed or constant, two datasets may contain a different number of corresponding features. However, also in this case it is possible to use corresponding features in order to assign a product category.

A change in number and/or type of characteristic features may probably occur if the characteristic features to be considered in a set of characteristic features can be selected by the user. Further, it is conceivable that the number and/or type of characteristic features changes upon a change or update of a program adapted to be executed for conducting the method as proposed by the invention.

The step of comparing the extracted features in particular shall include comparing a certain or selected number of extracted features to corresponding features of existing datasets already stored in the database. This in particular shall include cases in which not all the extracted features are used for assignment of a food category. Exclusion of certain features may be conducted on the basis of respective numerical values of the feature in question and/or pre-selections and/or weighting factors and the like.

Based on the result of the comparison as described beforehand, the further step of assigning to the extracted characteristic features the food category that is linked to a stored dataset having identical characteristic features or, within preset boundaries, having similar or overlapping characteristic features, is conducted. This shall mean, that based on the comparison, a stored dataset is or may be identified having identical, similar or overlapping characteristic features. Identifying a respective dataset having identical or similar or mostly similar characteristic features may be implemented as the step of comparing the extracted characteristic features to stored datasets. For identifying a relevant, in particular the most relevant stored dataset, a mathematical measure or model or algorithm may be used. If the database does not contain a stored dataset allowing the assignment of a food category to the at least one food item, the user can be informed accordingly and/or the user may be prompted to manually assign a food category to the food item. In particular in this case, a new dataset will be stored in the database.

Assigning the food category based on datasets already stored in the database has the advantage that frequently used, i.e. processed, food or food items can be recognized comparatively quick and safely. Owing to the fact that new datasets may be stored in the database, the method of recognizing and assigning a food category to a food item can continuously be improved. This in particular means that the proposed method provides a type of self-learning capability for the appliance. It shall be noted, that due to the self-learning effect, automatic operation or food recognition provided by the appliance is not necessarily a requirement to be implemented by the manufacturer of the appliance, but can advantageously and in a self-learning manner be set up by the user, and can be adapted to the behavior of the user operating the appliance.

In one further embodiment, the step of comparing the extracted features to stored datasets in the database is conducted only if a preset number of datasets is stored or present in the database. In a yet further embodiment, assigning a food category to the extracted set of characteristic features is conducted only if a preset number of datasets containing or linked the respective food category is stored or present in the database. In these cases it may be prevented that false or useless assignments of food categories are presented to a user and/or used for operating the appliance.

In one further embodiment, the set of characteristic features comprises at least one of the following features: number of objects or subitems of the food item, dimension of the food item, in particular length, width, height, diameter, cross sectional area of the food item, volume of the food item, color of the food item, a color histogram of the food item, existence and/or number and/or size of particles or segments of the food item at different color-thresholds and/or heights. In particular these parameters or features, but also similar features, allow comparatively reliable and secure assignments of a food category.

In an embodiment, it is provided that the at least one image of the food item is captured within the chamber by a camera. An image or several images taken from the food item may be captured in at least one of a top view, side view and bottom view.

Capturing of the at least one image may be carried out during and/or as soon as a respective food item is placed into or within the chamber. Further, capturing the at least one image may be started automatically, for example upon a certain event, for example an opening and/or closing operation of the chamber door. This in particular would mean that the respective, in particular first, step of the proposed method can be carried out automatically. The other steps may then also be carried out automatically.

However, starting the method and respective or subsequent steps of the method may require user interaction, in particular user activation. Anyhow, the way of starting and carrying out the method and related steps may be fixed or defined in operational parameters of the appliance, which may be open to individual user setting.

In one further embodiment, the food processing program intended to be executed as a final or last step of the proposed method-steps is at least one of automatically and manually assigned to the extracted set of characteristic features and food category. In the first instance, a fully automatic operation of the appliance can be obtained. Note that such an operational mode is desirable if the food category can be assigned with a comparatively and sufficiently high degree of accuracy. Otherwise, a user query may be used to assign the food processing program.

In this embodiment, it is also provided that an automatic assignment of the food processing program comprises the step of comparing the extracted set of characteristic features and food category with datasets stored in the database and selecting a processing program linked to a stored dataset identical or, within preset boundaries, similar to the extracted set of characteristic features and food category.

The identification of a food processing program to some extent corresponds to the identification of a dataset during assignment of a food category to a newly extracted set of characteristic features. For selecting and/or identifying a food processing program, respective characteristic features and food categories, in particular numerical value and/or string or other variables related thereto, may be compared. Based on this comparison, the most relevant, most suitable or reasonable food processing program may be selected. The selection of the food processing program may be conducted automatically, or require a user interaction, in particular selection, verification and/or validation. After identification of a food processing program, and optional user interaction, the operation of the appliance and food processing may be conducted in an automated manner.

It shall be noted, that the information relating to the assigned food processing program may be stored as an additional item and information in the database, in particular as an additional item of a dataset, in particular comprising a set of characteristic features and a food category linked thereto. The assigned food processing program and dataset may for example be linked to each other.

Storing also information about the type of food processing program, and in particular also operational parameters related thereto, in the database extends the scope of the database, in particular the self-learning ability of the database, also to respective food processing programs. As an example, identical or nearly identical food items often used and processed, in particular baked, by a user, such for example a certain type of cake, can be automatically processed by the appliance after a short training phase. But also food items handled comparatively rarely, or even new food items, may, at least partially, be properly handled, however based on a reduced number of information.

According to a further embodiment of the proposed method it is provided that generating the dataset comprises a step of linking, preferably via a weighting factor, the extracted set of features and food category to at least one food processing program. As already mentioned, the scope and usability of the database can be broadened by adding information about the food processing program.

The possibility to link or assign an identified food processing program with a weighting factor to a food item may account for the fact that under certain instances it may well be possible that a food item of a given category can be processed with different food processing programs. If several food processing programs are possible, the method may be adapted to suggest one of the food processing programs to the user and/or prompt the user to select one of the food processing programs, in particular amongst all identified food processing programs. The weighting factor may in particular be used to consider and keep the information about a preferred user selection related to the food processing program. The weighting factor may therefore correspond to or take into account the preferred user selection or setting.

In a further embodiment, the at least one food category may be assigned to the extracted set of characteristic features via a weighting factor. This may account for cases in which a set of characteristic features is or has been assigned to different, for example closely related, food categories. The weighing factor may be set to most appropriately comply with user preferences. In particular, the weighing factor may assign highest importance to the one food category representative of the most likely or most frequent assigned food category for the given set of characteristic features.

In particular, using weighing factors and similar provisions, such as for example deleting obsolete and inconsistent datasets, has the advantage that a change in the user preferences and habits can be trained to the database. As a consequence, the method of operating the appliance, in particular automatic operation, can always be kept close to the habits, in particular actual habits, of the user.

Note that the training and self-learning properties of the proposed method at least shall be controlled in such a way that automatic operation of the appliance does not lead to dangerous or even life-threatening conditions. As an example, assignments of food categories and food processing programs that are clearly senseless or even absurd, may either not be admitted to be stored into the database or may, in particular automatically, be excluded or deleted from the database again.

In a further embodiment of the method, parameters of the food processing program to be executed are stored as processing datasets in a processing database, if at least one of the following situations applies:
 a. the food processing program is not identically contained in the database; and
 b. the processing database does not contain, within predefined boundaries, a similar processing dataset.

Here, any amendment to an existing food processing program, which in the case of situation lit. b can be regarded as a relevant amendment or change, can be kept, and in particular an assignment to a dataset of characteristic features can be established for repeated use. The provision and ability to store amended food processing programs in a database while keeping respective assignments is a type of self-learning and training feature, with which user habits and preferences can be closely mapped in respective databases.

In a further embodiment, steps a) to d) of the method as proposed may be executed repeatedly during processing the food item. Here it shall be noted that the method as proposed preferably is executed at or before the start of food processing. In this embodiment, however, it is further provided, that if a change in at least one of the extracted set of characteristic features and food category, in particular as compared to an earlier or former set of extracted features of the same food item, occurs or is observed, the food processing program may be adapted to account for the change in the set of characteristic features and food category during operation. Here, automatic food processing can be obtained based on the set of characteristic features representative of a respective food item at respective points in time.

As an example, a situation in which a frozen food item in a first stage is defrosted and in a second stage is baked shall be considered. During the first stage, the method is likely to assign, based on a respective set of extracted features, the food category "frozen" and may therefore propose or even automatically conduct the appliance in defrosting mode. In the instance that the food item is completely defrosted and the method is repeatedly executed, the method is likely to assign based on a respective new set of extracted features, the food category "defrozen, ready for baking" and may therefore propose or even automatically switch the appliance to baking mode to finally conduct a baking operation of the food item. Note that one or several intermediate steps and/or stages are possible, in particular if different intermediate food categories, such as between "frozen" and "defrozen" exist.

After all, it becomes clear, that the proposed method is effective in improving automated and/or semi-automated operation of an appliance for processing food, in particular oven or baking oven. In particular, it shall be noted that the method is effective in providing a self-learning and self-training capability to the appliance. Further, it is possible that the user can build up a training data set for food recognition, and the user in embodiments can give direct feedback on the quality of recognition, i.e. assignment of food category.

Repeated food items, i.e. food items that are frequently used, can in particular be recognized via feature comparison even before sufficient statistical data is contained and stored in the database. If sufficient data is available in the database, even unknown foods, i.e. foods items to be processed for the first time, can be recognized via a pattern recognition.

In continuously storing relevant datasets in the database, a pattern recognition method can be trained, which in the end greatly simplifies operational effort required by the user. A further advantage is that the appliance, in particular pattern recognition, can be trained, in particular in comparatively short time intervals, to the habits and preferences of the user. As a consequence, the user satisfaction with semi-automated or even automated operation of the appliance, in particular baking oven, will or can be increased.

An appliance for processing food items, in particular an oven, preferably a baking oven, is provided. The proposed baking oven comprises a control and operating system or unit adapted to operate the appliance with a method as proposed herein including any embodiments and variants mentioned and described so far. As to advantages and advantageous effects of the appliance, reference is made to the description above and further below. Considering the appliance, the control and operating system or unit may be adapted to implement a program, which, when executed by the control and operating system, leads to a method as proposed herein.

In one embodiment of the appliance, it may be provided with a food processing chamber adapted to accommodate at least one food item to be processed, wherein the appliance comprises an image generating unit adapted to capture the at least one image of the at least one food item placed in or within the food processing chamber. The image generating unit may comprise at least one camera. The at least one camera may be placed and positioned at least one of at or on a top wall, side wall, front and back wall. However, any other position for the camera is possible. The camera in particular may be used by the proposed method in capturing respective images required for extracting the set of characteristic features.

In a further embodiment of the appliance, there is provided at least one database, comprising at least one storage unit or memory, in particular non-volatile memory, adapted and provided for storing datasets, in particular cross-linked datasets, containing sets of characteristic features, food categories and/or food processing programs, in particular parameters of respective food processing programs. The database and at least one storage unit may be a local database, i.e. specifically provided for a respective appliance in question. However, the database may also be a remote database accessible via conventional wire-bound and/or wireless data connections. As the database can in accordance with the proposed method be trained for single users or a group of users, the database may be assigned to a respective single user or group of users, and, if required, provided or initialized in the event that the single user or group of users is about to operate the appliance.

Selected embodiments of the invention will now be described in connection with the annexed figures, in which:

FIG. 1 shows an exemplary flow chart of a variant of the proposed method; and

Figure 2:
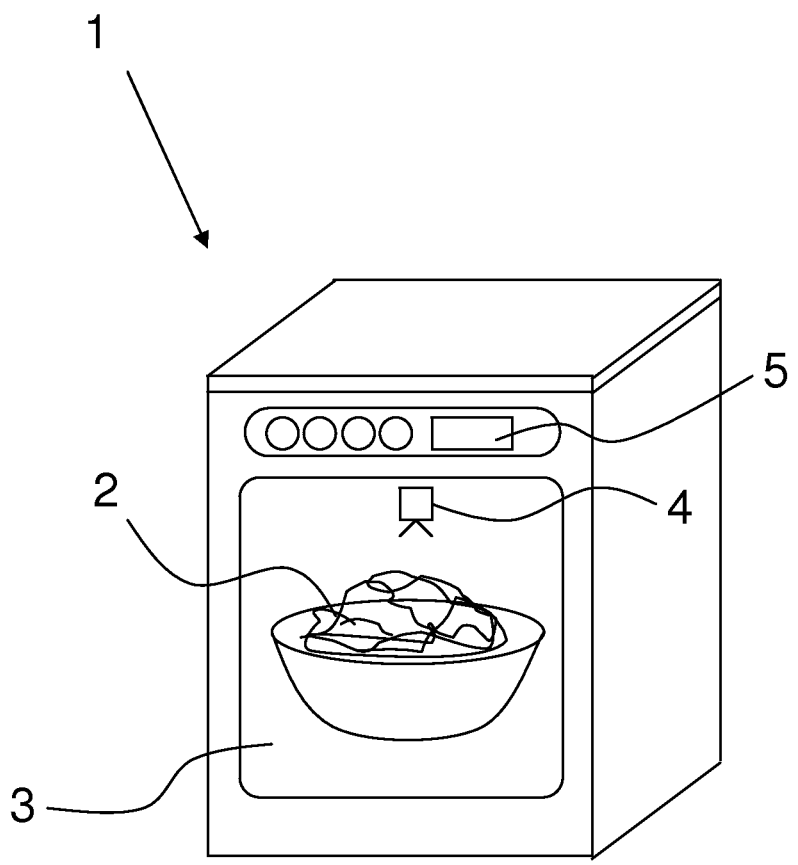

FIG. 2 schematically shows a perspective view of a proposed appliance.

FIG. 1 shows an exemplary flow chart of a variant of a method of operating an appliance for processing food. In the present case and for the present embodiment, the appliance is a baking or cooking oven 1. It shall however be noted, that the invention is not restricted to baking or cooking ovens, but can be applied to other appliances as well. In FIG. 1, different stages of the flow chart are designated by reference signs S1 to S9 and are described below.

FIG. 2 schematically shows the baking oven 1 adapted to conduct the method as described in connection with stages S1 to S9 in FIG. 1.

In a first stage S1 of the method of operating the baking oven 1 a user puts a food item 2 to be processed, in particular baked, such as a piece of meat or a baking tin filled with dough and the like, into a cavity 3 of the oven 1.

In a second stage S2 an image of the food item 2 is captured. For capturing the image of the food item 2, a camera 4 is provided. The camera 4 may be of any type in particular suitable for being operated in respective hot environments. The camera 4 in FIG. 2 is indicated only schematically, but can be mounted on or at a top, back, front and side wall of the cavity 3. Note that more than just one camera may be used.

In a third step S3 a set of characteristic features of the food item 2 is extracted from the at least one image captured by the camera 4. As characteristic features any of the features identified further above may be used.

The extraction of the set of characteristic features as well as capturing the image can be conducted and controlled by a control and operating unit 5 of the oven 1. For sake of simplicity, the control and operating unit 5 is indicated at a front face of the oven 1. However, it can be provided at any location within the casing of the baking oven 1.

In a fourth step S4 the control and operating unit 5 compares the features of the set of extracted features to a database (not shown) in order to find out if an identical or similar dataset exists which already is or has been assigned to a food category.

The database may be implemented on a non-volatile memory unit, assigned to the control and operating unit 5. In the database there may be stored datasets respectively comprising sets of characteristic features. In addition, each dataset of characteristic features is linked to or contains information about a food category. The food category of the dataset contained in the database may either be the result of an automatic assignment or of an assignment based on a user query. The food category may contain information such as "frozen", "non-frozen", "raw meat", "dough" and the like.

If the control and operating unit 5 finds that the database does not contain a dataset with identical or similar characteristic features and assigned food category, the method will proceed with stage S6. In stage S6, the control and operating unit 5 initiates a query to the user of the baking oven 1 to identify and/or select, in particular to input, a food category applying to the food item 2 placed within the cavity 3.

If the user assigns an appropriate food category, the extracted set of characteristic features together with the assigned food category, or just a link to the selected food category, is stored in the database as a new dataset in stage S7. At this stage, i.e. at stage S7, the method proceeds to stage S9, in which a program for processing the respective food item 2 properly categorized is started. It shall be noted, that the program for processing the food item 2 may be automatically selected or assigned by the control and operating unit 5. The selection of an appropriate program may be based on characteristic features, food category and/or on further information stored in the database, in particular in connection with previous operations of the baking oven 1.

If the control and operating unit 5, however, finds that the database does contain an identical or similar dataset of characteristic features together with an assigned food category, it may propose or suggest in stage S5 a food category based on the dataset available in the database.

In stage S8, which may be optional, the control and operating unit 5 may start a user query whether or not the food category identified or assigned in stage S5 is appropriate. If the assigned or identified food category is found not to be appropriate, the method will proceed with stage S6. Reference is made to the description above.

If, however, the assigned or identified food category is found to be appropriate, such as for example if a user accepts the assigned food category, the method may proceed to stage S9. Reference in particular is made to the description above.

According to the proposed method, a food category of a food item can be assigned automatically based on features extracted from an image of the food item. For improving the food category assignment, the method is provided with self learning performance. In particular the fact that, for example in stage S7, new datasets connecting characteristic features with food categories are stored in the database contributes to the self learning properties.

Self learning in particular shall mean that if the database is maintained for some time and has a sufficient number of entries per food category, a pattern recognition method, such as an artificial neural network, can be trained, in particular intended to categorize unknown food, i.e. food not yet contained in the database.

As with the method shown and described in FIG. 1, the user may have the option to choose and/or correct the food category in case of inadequate automatic assignments. Thereby, the quality of previous learning or training becomes available and can be retrained if necessary. In all, automatic, at least however semiautomatic, operation of the baking oven can be improved.

LIST OF REFERENCE NUMERALS 1 baking oven
2 food item
3 cavity
4 camera
5 control and operating unit
S1-S9 first to ninth stage

The invention claimed is:

1. A method of operating an appliance for processing food, wherein the appliance comprises a chamber adapted to accommodate and process at least one food item, wherein the method comprises steps of:
   a) capturing at least one image of the at least one food item placed or to be placed into the chamber;
   b) extracting a set of characteristic features of at least one of the at least one food item from the captured image;
   c) comparing the set of characteristic features with at least one existing dataset stored in a feature database;
   d) suggesting, based on the comparison, at least one food category to at least one of the at least one food item;
   e) assigning at least one final food category based on a user input in which the user is requested to affirm or correct the food category suggested;
   f) generating and storing an additional new dataset comprising the extracted set of features linked to the assigned food category in the feature database; and
   g) executing a food processing program assigned to the extracted set of characteristic features and the assigned food category,
   wherein the assigned food category is from a predefined set of food categories, and
   wherein the comparison identifies that the extracted set of characteristic features is not found in the database or differs from a dataset stored in the database by a predefined amount, or the assigned food category differs from the food category suggested.

2. The method according to claim 1, wherein the at least one existing dataset comprises a set of characteristic features of at least one food item and an assigned food category, and the step of suggesting at least one food category comprises suggesting a food category linked to a stored dataset having identical characteristic features or, within preset boundaries, similar or overlapping characteristic features to the extracted characteristic features.

3. The method according to claim 2, wherein the step of comparing the extracted features with stored datasets in the database is conducted only if a preset number of datasets is stored in the database.

4. The method according to claim 1, wherein the step of assigning at least one final food category to the extracted set of characteristic features is conducted only if a preset number of datasets containing the food category is stored in the database.

5. The method according to claim 1, wherein the set of characteristic features comprises at least one of the following features: number of objects or subitems of the food item; dimension of the food item comprising length, width, height, diameter, cross sectional area of the food item; volume of the food item; color of the food item; a color histogram of the food item; and existence and/or number and/or size of particles or segments of the food item at different color-thresholds.

6. The method according to claim 1, wherein the image of the food item is captured within the chamber by a camera.

7. The method according to claim 1, wherein the food processing program is automatically assigned by comparing the extracted set of characteristic features and the assigned food category with datasets stored in the database and selecting a processing program linked to a stored dataset identical or, within preset boundaries, similar to the extracted set of characteristic features and the assigned food category.

8. The method according to claim 1, wherein the step of generating and storing an additional new dataset comprises a step of linking the extracted set of features and the assigned food category to at least one food processing program.

9. The method according to claim 1, wherein the at least one food category is suggested via a weighting factor.

10. The method according to claim 1, wherein parameters of the food processing program to be executed are stored as processing datasets in a processing database, if at least one of the following situations applies:
   a. the food processing program is not identically contained in the database; and
   b. the processing database does not contain, within predefined boundaries, a similar processing dataset.

11. The method according to claim 1, wherein at least steps a) to f) are executed repeatedly during processing the food item and, if a change in at least one of the extracted set of characteristic features and the assigned food category occurs, the food processing program is adapted to account for the change.

12. A method of operating an appliance for processing food, wherein the appliance comprises a chamber adapted to accommodate and process at least one food item, wherein the method comprises steps of:
   a) capturing at least one image of the at least one food item placed or to be placed into the chamber;
   b) extracting a set of characteristic features of at least one of the at least one food item from the captured image;
   c) comparing the set of characteristic features with at least one existing dataset stored in a feature database;
   d) suggesting, based on the comparison, at least one food category to at least one of the at least one food item;
   e) assigning at least one final food category based on a user input in which the user is requested to correct the food category suggested, the assigned food category differing from the food category suggested;
   f) generating and storing an additional new dataset comprising the extracted set of features linked to the assigned food category; and
   g) executing a food processing program assigned to the extracted set of characteristic features and the assigned food category.

* * * * *